(12) United States Patent
Stager et al.

(10) Patent No.: US 8,295,384 B2
(45) Date of Patent: Oct. 23, 2012

(54) ESTIMATING SPATIAL EXPANSION MATRIX IN A MIMO WIRELESS COMMUNICATION SYSTEM

(75) Inventors: Paul J. Stager, Akron, OH (US); Matthew A. Silverman, Richfield, OH (US)

(73) Assignee: Cisco Technology, Inc., San Jose, CA (US)

( * ) Notice: Subject to any disclaimer, the term of this patent is extended or adjusted under 35 U.S.C. 154(b) by 238 days.

(21) Appl. No.: 12/823,236

(22) Filed: Jun. 25, 2010

(65) Prior Publication Data

US 2011/0019759 A1    Jan. 27, 2011

Related U.S. Application Data

(60) Provisional application No. 61/227,546, filed on Jul. 22, 2009.

(51) Int. Cl.
*H04B 7/02* (2006.01)
*H04L 1/02* (2006.01)

(52) U.S. Cl. ........ 375/267; 375/299; 375/347; 375/346; 455/500; 455/101; 455/562.1

(58) Field of Classification Search ................. 375/267, 375/299, 347, 346; 455/500, 101, 562.1
See application file for complete search history.

(56) References Cited

U.S. PATENT DOCUMENTS

| | | | |
|---|---|---|---|
| 7,620,423 B2 * | 11/2009 | Jin et al. | 455/562.1 |
| 7,978,784 B2 * | 7/2011 | Zhang et al. | 375/299 |
| 2007/0286303 A1 * | 12/2007 | Yamaura | 375/267 |
| 2009/0042618 A1 * | 2/2009 | Hedayat et al. | 455/562.1 |
| 2011/0051636 A1 * | 3/2011 | Van Nee et al. | 370/310 |
| 2011/0268215 A1 * | 11/2011 | Khojastepour | 375/267 |

OTHER PUBLICATIONS

"Wi-Fi Certified™ 802.11n Draft 2.0: Longer-Range, Faster Throughput, Multimedia-Grade Wi-Fi® Networks", 2007 Wi-Fi Alliance, pp. 1-18.
"802.11n: The Standard Revealed", 2009 Cisco Systems Inc., pp. 1-23.

* cited by examiner

*Primary Examiner* — Phuong Phu
(74) *Attorney, Agent, or Firm* — Edell, Shapiro & Finnan, LLC (57) ABSTRACT

Techniques are provided to derive the spatial expansion matrix used when one wireless communication device sends a transmission with a number of spatial streams less than the number of its transmit antennas to another wireless communication device. These techniques involve, at the receiving wireless communication device, generating channel estimate information for received transmissions sent with different numbers of spatial streams and to determine when sufficient information is available to estimate a spatial expansion matrix for different spatial expansion scenarios.

27 Claims, 6 Drawing Sheets

ESTIMATING SPATIAL EXPANSION MATRIX IN A MIMO WIRELESS COMMUNICATION SYSTEM

RELATED APPLICATION

This application claims priority to U.S. Provisional Patent Application No. 61/227,546, filed Jul. 22, 2009, the entirety of which is incorporated herein by reference.

TECHNICAL FIELD

The present disclosure relates to multiple-input multiple-output (MIMO) wireless communication systems.

BACKGROUND

In a MIMO wireless communication system, a first device having a plurality of antennas sends multiple spatial stream transmissions to a second device having a plurality of antennas. When the number of spatial streams sent by the first device is less than the number of transmitters (and transmit antennas) of the first device, the spatial streams are expanded across transmitters of the first device in order to fully utilize the transmitter resources available at the first device.

In an IEEE 802.11n wireless communication system, the method of spatial expansion is not defined for high throughput (HT) transmissions; however spatial expansion is desired to fully utilize the transmitter resources. Knowledge of the spatial expansion method employed at the transmitting (first) device is desired at the receiving (second) device in order to improve the beamforming methods or adaptive rate selection performed at the second device for transmissions made to the first device.

DESCRIPTION OF EXAMPLE EMBODIMENTS

Overview

Techniques are described herein for deriving the spatial expansion matrix used by one wireless communication device when sending to another wireless communication device transmissions comprising a number of spatial streams that is less than the number of antennas of the transmitting wireless communication device. Transmissions from the second wireless communication device are received at a plurality of antennas of the first wireless communication device. Channel estimate information is generated for received transmissions for a wireless channel between the plurality of antennas of the first wireless communication device and the plurality of antennas of the second wireless communication device. A number of spatial streams for received transmissions is estimated based on transmit rate information contained in the received transmissions. The estimated number of spatial streams for received transmissions is evaluated with respect to a number of antennas at the second wireless communication device to determine when sufficient information is available to estimate a spatial expansion matrix used by the second wireless communication device when sending to the first wireless communication device transmissions comprising a number of spatial streams less than the number of antennas of the second wireless communication device. When it is determined that sufficient information is available, an estimate of the spatial expansion matrix is generated from the channel estimate information for a received transmission determined to have been sent with a number of spatial streams less than the number of antennas of the second wireless communication device and from the channel estimate information for a received transmission determined to have been sent without spatial expansion.

Example Embodiments

Figure 1:
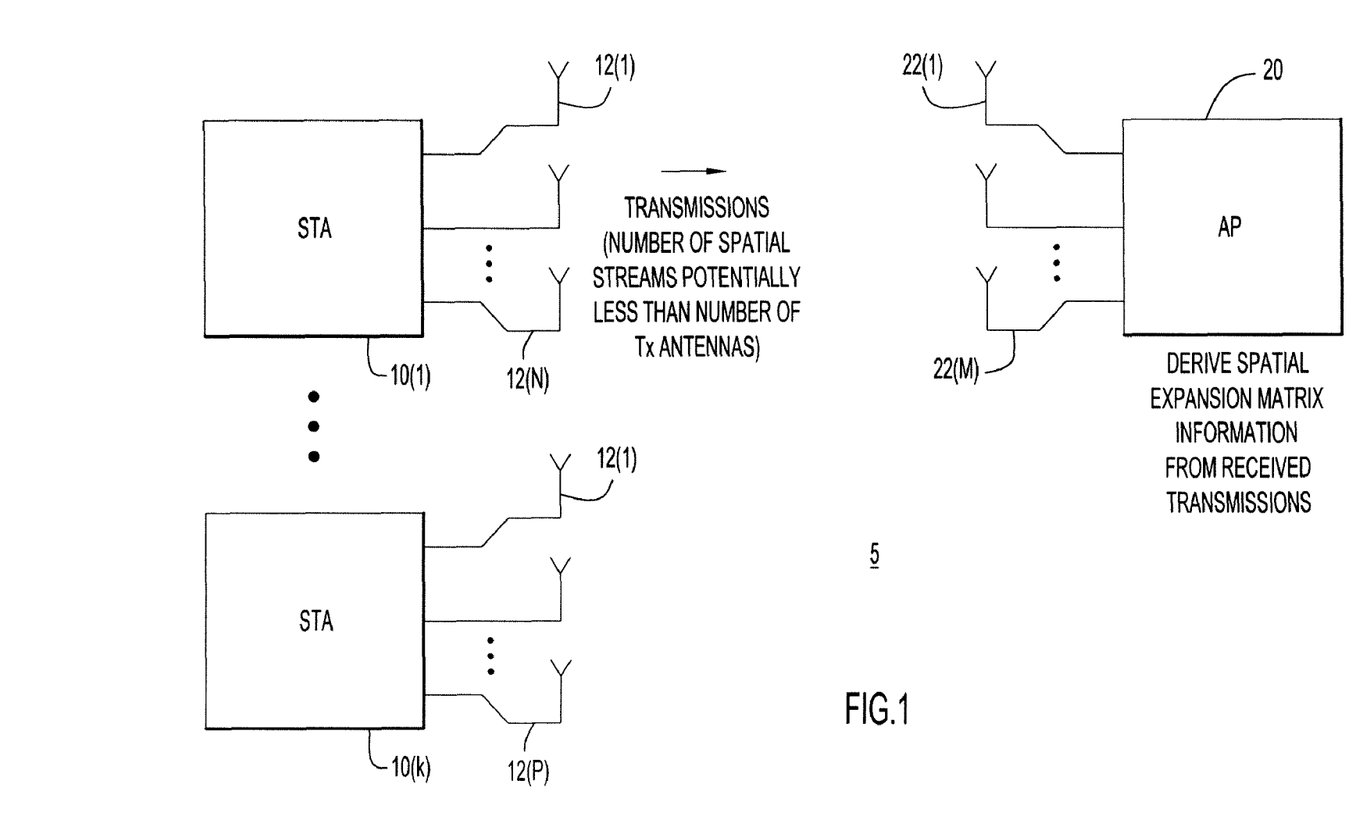
FIG. 1 is an example of a block diagram of a wireless communication system in which a first wireless communication device receives transmissions sent by a second wireless communication and the first wireless communication device derives spatial expansion matrix information used by the second wireless communication device for the transmissions.

Referring first to FIG. 1, a block diagram of a wireless communication system 5 is shown comprising a plurality of wireless local area network (WLAN) stations (STAs) 10(1)-10(k) each of which can wirelessly communicate with WLAN access point (AP) 20. The AP 20 may be referred to as a first wireless communication device and any given STA 10(1)-10(k) may be referred to as a second wireless communication device. This nomenclature is arbitrary. Another term used herein for a WLAN STA is a "client".

Each STA 10(1)-10(k) comprises a plurality of transmit antennas which need not be the same across all STAs 10(1)-10(k). For example, STA 10(1) comprises a plurality of antennas 12(1)-12(N) and STA 10(k) comprises a plurality of antennas 12(1)-12(P). The AP 20 comprises a plurality of antennas 22(1)-22(M) and these same antennas are used for receiving transmissions as well as sending transmissions, though a different number of antennas at the AP 20 may be used for transmission that the number of antennas used for reception. The STA 10(1) has the ability to transmit multiple spatial streams simultaneously via its antennas 12(1)-12(N) to the AP 20 via the multiple-input multiple-output wireless channel between the two devices. Likewise, the AP 20 may transmit multiple spatial streams to any given STA. Again, each device may use the same antennas for transmission and reception.

It is not uncommon for a STA to use "spatial expansion" whereby the number of spatial streams that the STA, e.g., STA 10(1), transmits for a given transmission (frame) instance to the AP 20 is less than the number of transmitters, i.e., transmit antennas, at the STA 10(1). Furthermore, cyclic delay diversity (CDD) is commonly employed across the transmit paths (chains) at the STA 10(1). Moreover, the STA uses one spatial expansion matrix when transmitting one spatial stream from multiple antennas and another spatial expansion matrix when transmitting 2 spatial streams from multiple antennas (more than 2 antennas). Thus, the STA uses a different spatial expansion matrix depending on the number of spatial streams (which is less than the number of antennas at the STA) for a given transmission. To this end, the STA will store a plurality of spatial expansion matrices and use the appropriate spatial expansion matrix depending on the number of spatial streams it sends in a transmission. To achieve the best possible performance, the AP determines each of the spatial expansion matrices used by a given STA. The delay path on each transmitter of the STA 10(1) may vary, thereby adding a phase delay. The effects of spatial expansion, CDD and transmit phase delay combine to alter the ability of the AP 20 to estimate the channel conditions based on a received frame/transmission from the STA 10(1). The same applies for each of the other STAs that communicate with the AP 20.

The spatial expansion matrix information is useful to sound an extra dimension of the channel when the uplink transmission does not fully sound the channel. This is useful in generating downlink beamforming weights and also in shifting between different transmit rates for downlink transmissions because knowledge of the spatial expansion is more information about the channel and is indicative of the transmit data rates that the channel will support. The spatial expansion matrix Q is useful to improve beamforming performance and, to a lesser extent, improve rate selection used by the AP for downlink transmissions.

The following equations describe the spatial expansion, CDD and transmit phase delay information associated with the wireless channel.

$$R = HBQ_{CDD}Q_{SE}S$$

$$Q = Q_{CDD}Q_{SE}$$

$$R = HBQS$$

where $Q_{SE}$ is the spatial expansion matrix, $Q_{CDD}$ is the CDD matrix, B is the transmit phase delay matrix, H is the estimated uplink channel, S is the transmit signal and R is the receive signal. These quantities are represented on a per subcarrier basis in an orthogonal frequency division multiplexed (OFDM) system, such as that used in IEEE 802.11n systems. For simplicity, the subcarrier subscripts are omitted here. $Q_{SE}$, $Q_{CDD}$ and B are not specified by the IEEE 802.11n standard and thus are up to the design and implementation of the equipment manufacturer.

In general, $Q_{SE}$ is an N×M matrix, where N is the number of transmit antennas at the transmitting device and M is the number of spatial streams in a given frame transmission from the transmitting device to the receiving device. $Q_{CDD}$ and B are N×N diagonal matrices.

When estimating the per subcarrier downlink channel, $\hat{H}^{Down}$, for downlink beamforming weight estimation or power allocation at the AP for power across spatial subchannels based on an uplink packet from the STA, the spatial expansion matrix, here simply denoted as Q, of the STA can have a significant impact. If the number of spatial streams, denoted Nss, of the uplink packet is less than the number of transmitters (and antennas), Ntx, of the STA, spatial expansion is typically used, meaning that power for a given spatial stream is allocated across multiple transmit chains and cyclic delay diversity (CDD) is used across those transmitters. The impact is as follows.

$$\hat{H}^{UP} = HQ$$

$$\hat{H}^{Down} = (\hat{H}^{UP})^T = Q^T H^T$$

where $^T$ denotes the matrix transpose.

For uplink packets with Nss=Ntx, there is no spatial expansion and no effect on beamforming or power allocation because Q will be cancelled out during beamforming vector calculation. Therefore, if there is spatial expansion in the uplink frame, the channel estimate will be based on H and Q instead of just H. In some cases, if Q is known, it is beneficial to use the knowledge of Q to obtain a better channel estimate.

Accordingly, a wireless device is provided that is configured to solve for or derive the uplink spatial expansion and CDD matrix information from several received frames sent from the other device. The device may store this information and distribute it across a centralized controller architecture for use subsequently by other wireless devices or the same wireless device at a later time.

Figure 2:
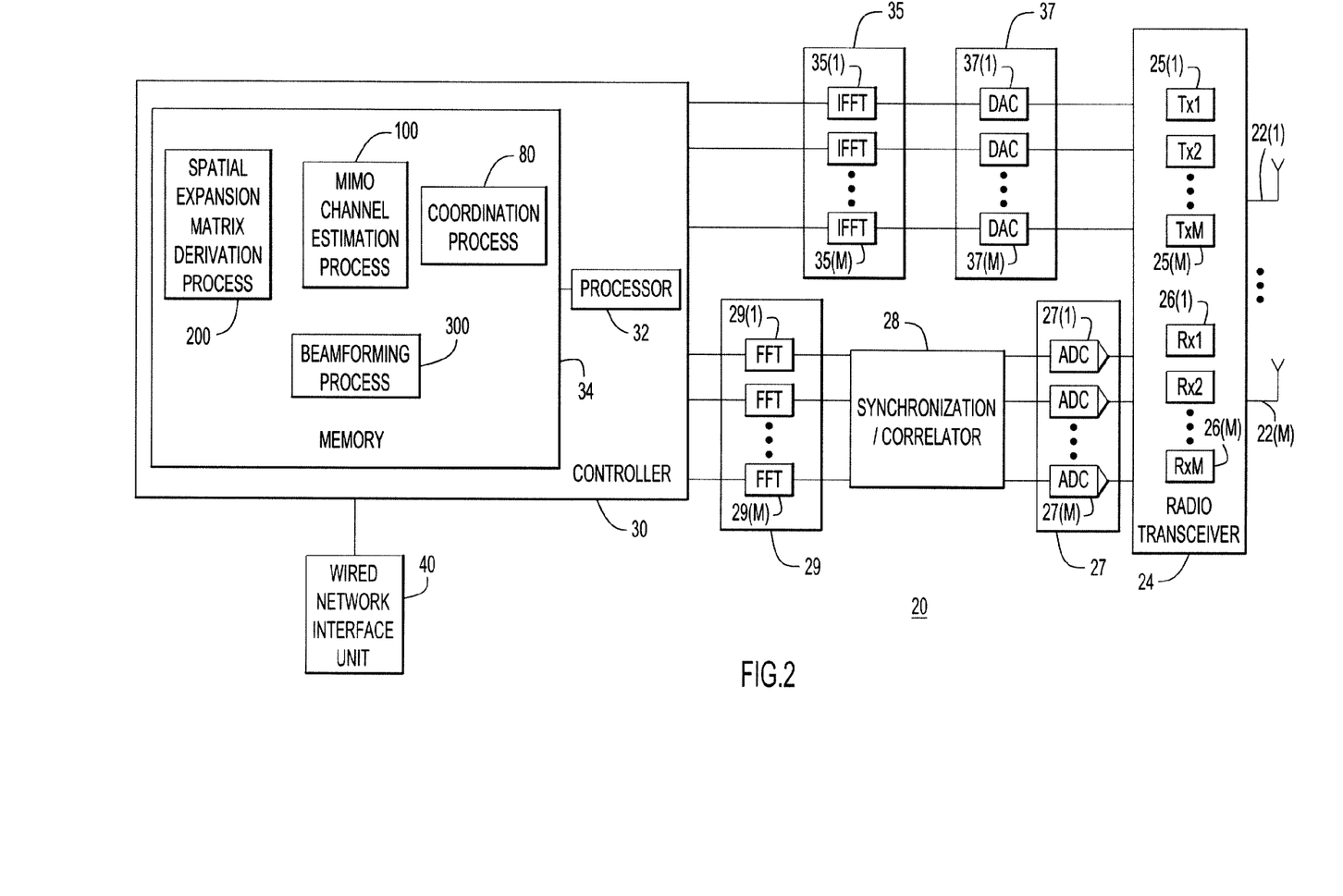
FIG. 2 is an example of a block diagram of the first wireless communication device configured to derive the spatial expansion matrix information.

FIG. 2 illustrates an example of a block diagram of a wireless communication device, e.g., an AP or STA, configured to derive the uplink spatial expansion and CDD matrix information. In this example, the diagram in FIG. 2 is a block diagram for the AP 20. However, any one or more of the STAs 10(1)-10(k) may be similarly configured in order to derive the downlink spatial expansion and CDD matrix information.

The device 20 comprises a radio transceiver 24 that comprises a plurality of transmitters Tx1, ... TxM at references numerals 25(1)-25(M) and a plurality of receivers Rx1, ..., RxM at reference numerals 26(1)-26(M). In this example, the number of transmitters equals the number of receivers, but this is not required. There is a block 27 of analog-to-digital converters (ADCs) 27(1)-27(M) that are configured to convert antenna-specific analog receive signals from corresponding ones of the receivers 26(1)-26(M) in the radio transceiver 24 to corresponding digital receive signals. The digital receive signals are supplied to a synchronization/correlation block 28 that is configured to perform basic frame synchronization functions associated with a receive transmission. A block 29 of Fast Fourier Transform (FFT) modules 29(1)-29(M) is provided to convert the receive signals to frequency domain signals for analysis by the controller 30. Further processing of the received signals for recovering the included information, channel estimation, etc., is performed by a controller 30.

Between the controller 30 and the radio transceiver 24 there is a block 35 of Inverse FFT (IFFT) modules 35(1)-35(M), one for each transmit path, and a block 37 of digital-to-analog converters (DACs) 37(1)-37(M), one for each transmit path. The outputs from the block 37 are supplied to corresponding ones of the transmitters 25(1)-25(M) in the radio transceiver 24.

The controller 30 comprises a processor 32, e.g., a digital signal processor, microprocessor, microcontroller, etc., configured with appropriate logic to perform the various functions described herein. Some or all of the functions of the controller 30 may be performed in a modem. Stored in memory 34 are instructions for several processes that, when executed by the processor 32, cause the processor to perform various operations for these processes as described further hereinafter. There are logic instructions stored in the memory 34 for a coordination process 80, a MIMO channel estimation process 100, a spatial expansion derivation (estimation) process 200, and additional processes such as a beamforming process 300 that use the output of the process 200. The AP 10 also has a wired network interface 40, e.g., Ethernet controller, to enable communications over a wired network.

The controller 30 invokes the coordination process 80 when a STA associates to the AP. The coordination process 80 is described hereinafter in connection with FIGS. 4 and 6. The controller 30 invokes the MIMO channel estimation process 100 to generate a channel estimate information for the wireless channel conditions between the AP 20 and a particular STA based on transmissions that AP receives from that STA. The controller 30 invokes the spatial expansion derivation process 200 to derive the spatial expansion matrix (and CDD matrix) for a STA. The spatial expansion matrix and CDD matrix are referred to hereinafter as being part of the transmit parameter information for a STA. The spatial expansion matrix inherently includes the CDD matrix information. The spatial expansion derivation process 200 also involves storing the transmit parameter information for one or more STAs that at one time have associated with the AP. The spatial expansion derivation process 200 is described hereinafter in connection with FIG. 5. The controller 30 invokes the beamforming process 300 to generate downlink beamforming weights used when the AP transmits one or more spatial streams to a STA. The beamforming process 300 involves generating and applying beamforming weight vectors to transmit signals to be transmitted via the transmitters of the radio transceiver 24. The beamforming process 300 uses channel estimate information generated by the MIMO channel estimation process 100. The MIMO channel estimation process 100 uses information derived from signals received at the plurality of antennas for a received transmission to compute a channel estimate. For example, the MIMO channel estimation process 100 may employ techniques specified by a wireless communication protocol, such as the IEEE 802.11n communication protocol, to compute a channel estimate from a received transmission at the plurality of antennas 22(1)-22(M).

The memory 34 is a tangible computer readable memory medium that stores or is encoded with software instructions for the logic of processes 80, 100, 200 and 300. When the processor 32 executes the instructions for processes 80, 100, 200 and 300, the processor 32 performs the operations described herein. The operations of the processes 80, 100, 200 and 300 may be embodied by programmable digital logic gates (e.g., field programmable gate array) or by an application specific integrated circuit (ASIC) that comprises fixed digital logic, or a combination of fixed and programmable digital logic gates.

Figure 3:
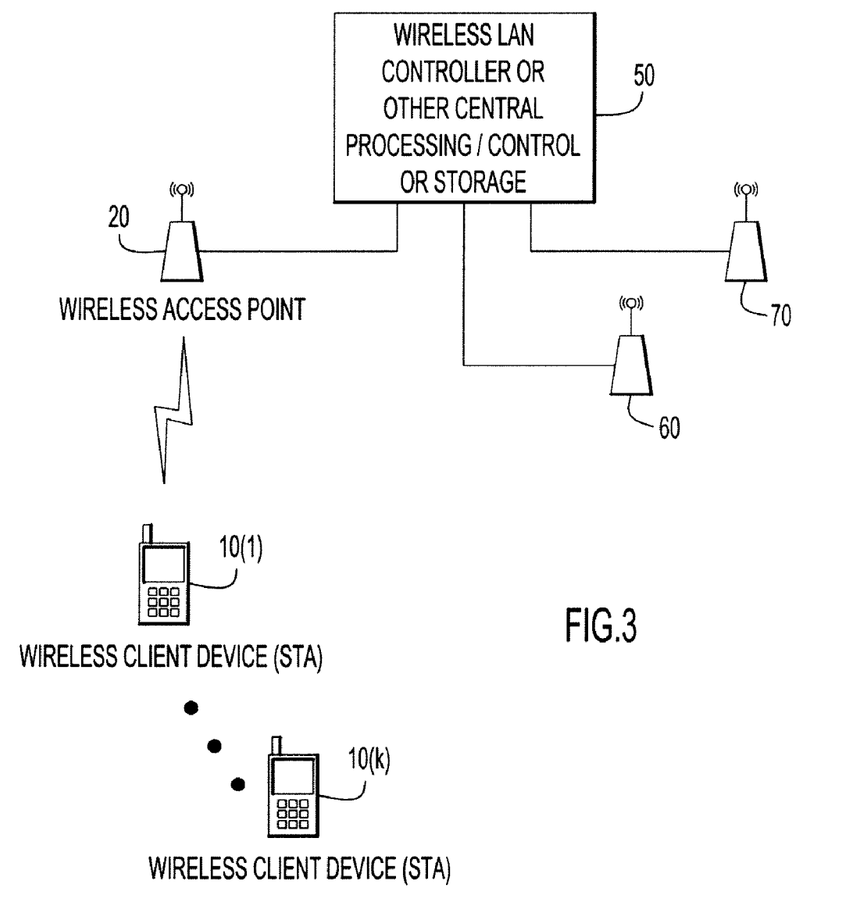
FIG. 3 is an example of a block diagram of a wireless local area network in which the first and second wireless communication devices operate, and wherein the first wireless communication device communicates with a wireless network controller that stores data for spatial expansion matrix information derived by the first wireless communication device for multiple second wireless communication devices.

Turning to FIG. 3, a diagram is shown for a WLAN deployment where a STA, e.g., STA 10(1), wirelessly communicates with the AP 20, and where the AP 20 is connected, via a wired network, to a WLAN controller or other central controller/storage apparatus shown at reference numeral 50. The WLAN controller 50 is also in communication with other APs shown at reference numerals 60 and 70. As explained further hereinafter, the WLAN controller 50 may store transmit parameter information form multiple STAs and any AP may retrieve this information from the WLAN controller 50 when needed, i.e., when that STA associates to an AP.

Figure 4:
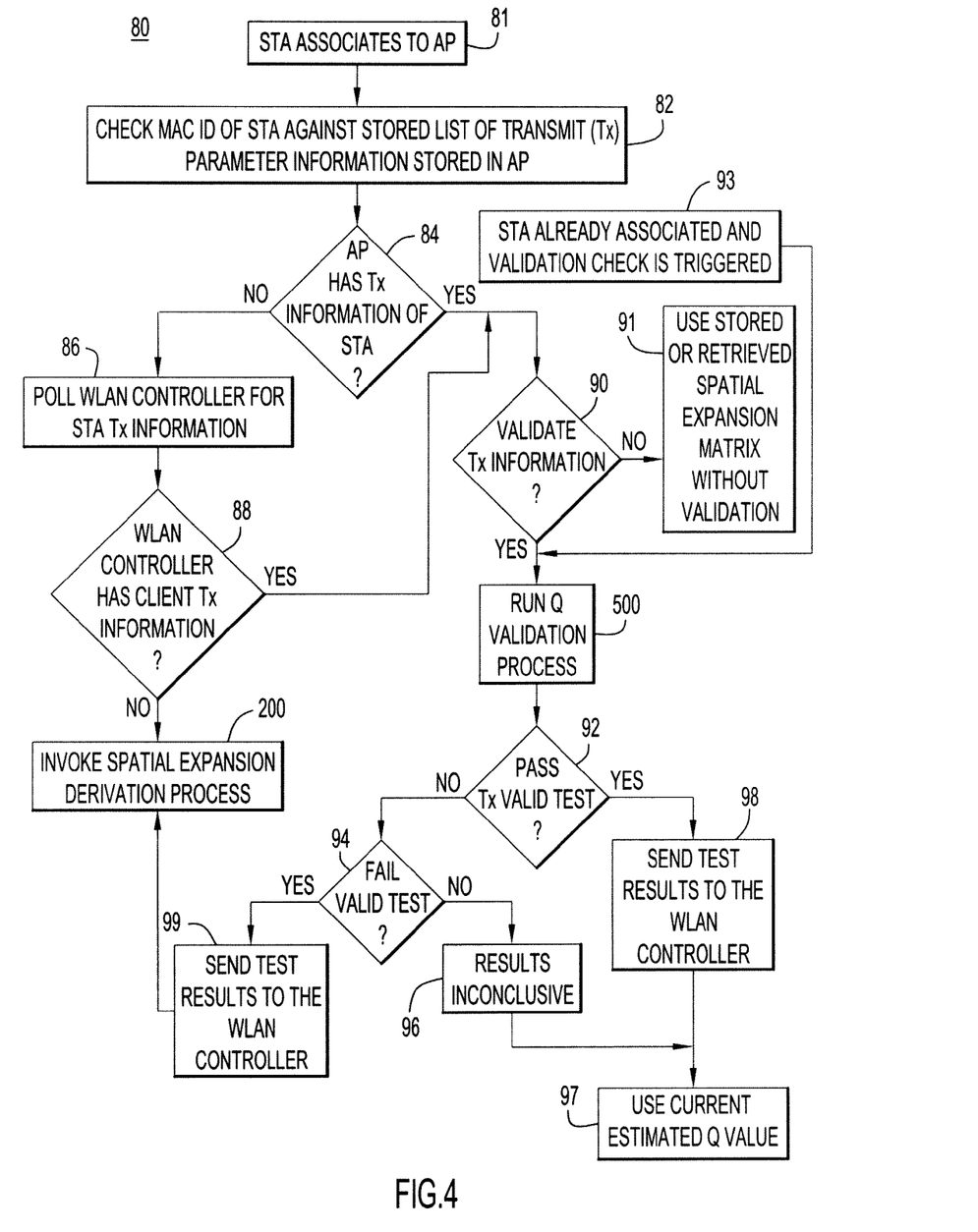
FIG. 4 is an example of a flow chart for a coordination process employed by the first wireless communication device when it is determined that it is serving a wireless client device for which its spatial expansion matrix information is not known.

Reference is now made to FIG. 4 to describe the coordination process 80 executed by the controller 30 in the AP 20 when the AP 20 determines that it is serving a STA, e.g., STA 10(1). At 81, a STA associates to an AP by transmitting a connectivity initiation message (e.g., an association request). The AP may store transmit parameter information for a plurality of STAs determined from prior communication sessions with the STAs. At 82, when a STA associates to an AP, the AP checks the medium access control identifier (MAC ID) of the client against transmit parameter information (e.g., Q matrix) stored in the AP. If at 84 the AP determines that it does not have the transmit parameter information of the particular STA, then at 86, the AP communicates with the WLAN controller 50 (FIG. 3) to request and retrieve transmit parameter information for the particular STA. If the WLAN controller indicates that it has the transmit parameter information for the particular STA at 88, then the process continues to 90. If the WLAN controller indicates to the AP that it does not have the transmit parameter information for the particular STA, then the spatial expansion derivation process 200 is invoked. The process 200 is described hereinafter in connection with FIG. 5.

When the WLAN controller determines that it has the transmit parameter information for the specified client, it sends it to the AP. Then at 90, the AP determines whether to validate the transmit information and if so runs a client spatial expansion matrix Q validation process at 500. The Q validation process 500 is described hereinafter in connection with FIG. 6. If the controller 30 determines not to validate the spatial expansion matrix Q for the STA, then at 91 the controller 30 uses either the stored transmit parameter information (at 84) that includes the spatial expansion matrix or the transmit parameter information that includes the spatial expansion matrix retrieved from the WLAN controller (at 88) without validation.

At 92, a determination is made whether the validation test passes, and if so, then the test results are sent to the WLAN controller at 98 which uses the current estimated spatial expansion matrix Q at 97. If at 92 it is determined that the spatial expansion matrix Q did not pass the validity test, then at 94 it is determined whether it failed the validity test. If it is determined to have passed or failed the validity test, then the test results are sent to the controller at 98 and 99, respectively. If it is determined not to have failed the validity test, then the results are deemed inconclusive at 96. If the transmit parameter information Q passes the validation test or the results are inconclusive, the AP can use that spatial expansion matrix Q until a test is failed. If failed, the spatial expansion derivation process 200 is initiated to replace the current Q estimation. FIG. 4 also illustrates at 93 that the validation process 500 may be triggered for a STA already associated to an AP.

A STA is capable of a variety of modulation and coding schemes (MCSs). The use of a multiple spatial stream transmission is not always supported by the channel rank or signal-to-noise ratio (SNR); however this is usually not known a priori by the STA. The selection of the optimal rate for the given channel rank and SNR is usually obtained by attempting the desired rate and responding by increasing the rate when the transmission is successful or decreasing the rate when unsuccessful (a retransmission is required as indicated by the absence of an ACK from the AP). The rate selection method therefore uses retry counts as feedback in the rate selection process. This methodology is ubiquitous in the IEEE 802.11 field. The use of retries as the predominant feedback metric implies all rates are eventually attempted during the normal course of frame exchanges between the STA and AP.

When an attempt is made with a multiple spatial stream rate where the number of spatial streams is equal to the number of transmit antennas, Nss=Ntx, the STA also transmits training fields sufficient to obtain the channel state information (CSI) independently from the spatial expansion or mapping of the transmission across STA transmit antennas. If the transmission is unsuccessful the frame will likely be followed by retransmissions at a lower data rate with fewer spatial streams. These retransmissions are likely (very likely) to occur well within the channel coherence time, and are useful along with the previous unsuccessful transmission in obtaining the STA spatial expansion matrix.

A successful uplink transmission is necessary to ensure proper decoding of the transmit address (client MAC ID). However successful uplink transmissions will not lead to the client sending subsequent transmissions at a lower data rate necessary to solve for the client spatial expansion and CDD.

The AP may intentionally withhold an ACK to force a lower rate selection by the client. This may be done temporarily until sufficient information is obtained without significant impact to the client uplink throughput. An alternative method exists to determine the spatial expansion of 2-transmitter client devices. With such an antenna configuration the highest number of spatial streams is 2. Two spatial stream uplink transmissions are provided from the client for data frames while an ACK sent from client to the AP are single spatial stream transmissions. The spatial expansion and CDD for a 2-antenna client is fully obtained from uplink 2-spatial stream data and 1-spatial stream ACK frames.

The following terms are defined for purposes of the descriptions herein.

Let, $N_{tx}^{AP}$=the number of AP transmit antenna.

$N_{rx}^{AP}$=the number of AP receive antenna.

$N_{tx}^{STA}$=the number of STA transmit antenna.

$N_{rx}^{STA}$=the number of STA receive antenna.

$$R_{(n)}^{(k)} = \begin{bmatrix} r_{1,1} & \cdots & r_{1,n} \\ \vdots & \ddots & \vdots \\ r_{N_{rx}^{AP},1} & \cdots & r_{N_{rx}^{AP},n} \end{bmatrix} = (N_{rx}^{AP} \times n)$$

received signal matrix for a n-spatial stream uplink on the $k^{th}$ subcarrier.

$S_{(n)}^{(k)}$=diag($S_{HT\text{-}LTF1}^{(k)}, S_{HT\text{-}LTF2}^{(k)}, \ldots, S_{HT\text{-}LTFn}^{(k)}$) the diagonal matrix formed by the high-throughput long training field (HT-LTF) symbols on the $k^{th}$ subcarrier.

$H^{(k)} = N_{rx}^{AP} \times N_{tx}^{STA}$ channel on the $k^{th}$ subcarrier.

$\hat{H}_{(n)}^{(k)}$=channel estimate obtained from an n-spatial stream uplink on the $k^{th}$ subcarrier.

$Q_{(n)}^{(k)}$=uplink spatial expansion matrix for an n-spatial stream transmission on the $k^{th}$ subcarrier.

$\hat{Q}_{(n)}^{(k)}$=estimate of the uplink spatial expansion matrix for an n-spatial stream transmission on the $k^{th}$ subcarrier.

An $N_{sts}=N_{tx}^{STA}$ spatial stream uplink frame contains sounding information sufficient to solve for the full channel matrix, $\hat{H}_{(n=N_{tx}^{STA})}^{(k)}$. A subsequent single spatial stream frame will have spatial expansion $Q_{(n<N_{tx}^{STA})}^{(k)}$. An estimate of this spatial expansion is obtained using the previous full channel estimate, $$\hat{Q}_{(n<N_{tx}^{STA})}^{(k)} = \hat{H}_{(n=N_{tx}^{STA})}^{(k)-1} R_{(n<N_{tx}^{STA})}^{(k)} S_{(n<N_{tx}^{STA})}^{-1}.$$

If the channel estimate matrix is not square, i.e. the system is over-determined with the AP having more antennas than the client, an appropriate estimation method such as the Moore-Penrose pseudo inverse may be applied.

Figure 5:
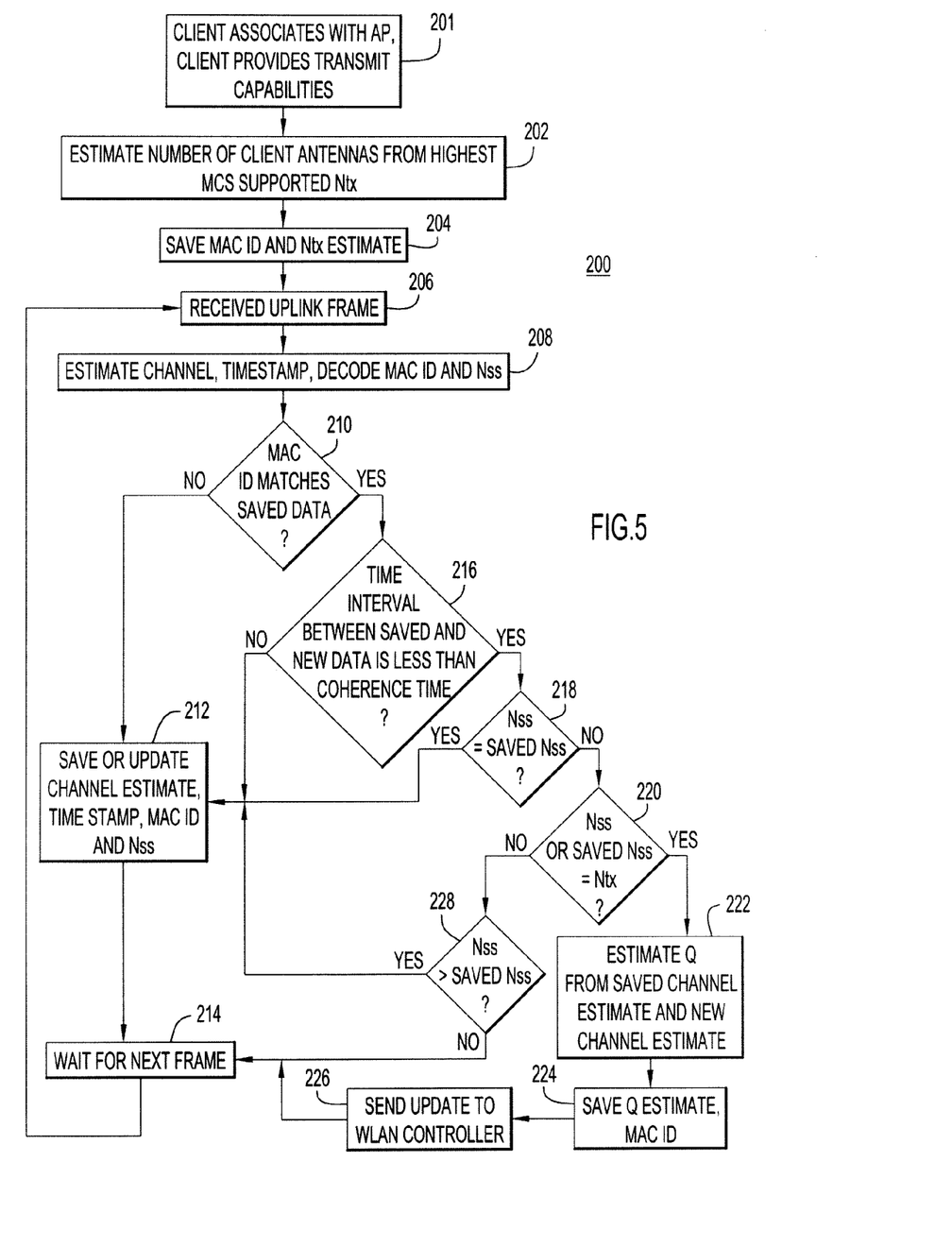
FIG. 5 is an example of a flow chart for a spatial expansion matrix derivation process.

With that background, turning now to FIG. 5, the process 200 for estimating the spatial expansion matrix Q for a client is now described. The process 200 involves analyzing data from reception of a variety of transmissions (frames) expected from a STA (AP) during the normal operation of the devices to solve for the expansion matrix at the AP (STA). The method is described where the AP solves for the STA spatial expansion matrix using uplink transmissions; however the method is fully applicable to downlink transmissions received by the STA to solve for the AP spatial expansion matrix.

At 201, when a STA associates with an AP it sends a connectivity initiation message (i.e. association request message). This message contains information about the STA basic transmit capabilities, such as transmit modulation scheme capabilities including the highest (fastest) modulation and coding scheme that the STA can use when transmitting to the AP. The highest modulation and coding scheme that a STA can use reveals the number of transmit antennas, Ntx, at the STA because the AP knows that certain modulation schemes require a certain number of antennas, according to the wireless communication protocol employed for communication between the AP and the STA. At 202, the AP estimates the number of transmit antennas (Ntx) from the highest MCS supported by the STA as indicated in the information contained in the connectivity initiation message. In addition, the AP can obtain the MAC ID for the STA from the connectivity imitation message. The AP may have already stored information indicating the number of antennas of the STA together with an identifier of the STA and the AP determines the number of transmit antennas of the STA in this manner. It is understood that the number of antennas at the STA, as used herein, refers to the number of antennas that the STA uses for transmitting to the AP. At 204, the AP saves the MAC ID and Ntx estimate for that STA.

At 206, the AP receives an uplink frame transmission from the STA. In fact, the AP will receive numerous transmissions from the STA and these transmissions are used to derive the spatial expansion matrix information used by the STA in transmitting to the AP. At 208, the AP generates channel estimate information for the wireless channel between the AP and the STA based on the received frame transmission. The AP generates a timestamp for the reception of the frame, decodes the MAC ID and determines the number of transmitted spatial streams, Nss, for that received transmission. The AP determines an estimate of the number of spatial streams for a received transmission based on transmit rate information contained in the header of the received transmission frame. The AP knows, according to the wireless communication protocol (e.g., IEEE 802.11n) that when a frame is sent using a certain value for a transmit rate, the frame was transmitted using a certain number of spatial streams. For example, when the transmit rate of the transmission is more than 7 Mbs but less than 16 Mbs, the AP knows that the frame was transmitted comprising 2 spatial streams (2-ss), when the transmit rate of the transmission is more than 16 Mbs, the AP knows that the frame was transmitted comprising 3-ss and when the transmission was sent at a transmit rate less than 7 Mbs, the AP knows that frame was transmitted comprising 1-ss. The AP will make this determination at 208 for each transmission that it receives. Thus, operation 208 involves estimating the number of spatial streams (Nss) for a received transmission based on transmit rate information contained in the received transmission.

At 210, the AP determines whether it has stored transmit parameter information for that MAC ID. If not, then the channel estimate, timestamp and estimated number of spatial streams Nss determined at 208 is saved or updated at 212 and the AP waits for the next frame from the STA as indicated at 214, after which functions 206, 208 and 210 are again performed. The purpose of this loop is to wait for several frames (transmissions) from the same STA.

When at 210, it is determined that there is transmit parameter information already stored for the MAC ID of a received frame (that is, there is transmit parameter information locally stored at the AP for this particular STA), then at 216, the time difference between the time of reception of the current transmission (used to compute the new data at 208) and the time of reception of the previously received transmission (used to compute the saved data which would have been stored at 212 during a previous cycle) is analyzed to determine whether it is less than a channel coherence time period for the channel between the AP and that STA. The coherence time period is the time for which a wireless channel is determined to not substantially change or deviate. If the answer is yes at 216, then the process goes to 218; otherwise, the process goes to 212 wherein the channel estimate information for the current received transmission, timestamp (time of reception) of the current received transmission and estimated number of spatial streams (Nss) for the current received transmission are stored with the MAC ID for the stay at 212. This stored data becomes the "saved" data for a previously received transmission when a next transmission (that becomes the "current" transmission) is received at 206.

Operations 218, 220, 222 and 228 involve evaluating the estimated number of spatial streams (Nss) for received transmissions with respect to the number of antennas (Ntx) at the STA to determine when sufficient information is available to estimate a spatial expansion matrix used by the STA when sending to the AP transmissions comprising a number of spatial streams less than the number of (transmit) antennas of the STA. When it is determined that sufficient information is available, the AP generates an estimate of the spatial expansion matrix from the channel estimate information for a received transmission determined to have been sent with a number of spatial streams less than the number of antennas of the STA and from the channel estimate information for a received transmission determined to have been sent without spatial expansion. The STA will not use a given spatial expansion matrix at all times because there will be times when it will be transmitting the same number of spatial streams as the number of transmit antennas at the STA. However, there will also be times when the STA will be transmitting with fewer spatial streams and it is for these transmission from the STA that the AP can improve performance when it knows the spatial expansion matrix used by the STA.

At 218, the newly estimated number of spatial streams Nss (for a current received transmission) is compared with the saved or stored value for Nss (determined for a previously received transmission) and if they match, then the process continues to 212. If they do not match, then at 220, a comparison is made between the estimated number of spatial streams (Nss) for the current received transmission or the estimated number of spatial streams for the previously received transmission (saved Nss) and the number of antennas Ntx at the STA. When Nss or the saved Nss is equal to Ntx (those transmission were sent without spatial expansion), then it is determined that sufficient information is available to generate an estimate of the spatial expansion matrix. Thus, at 222, an estimate of the spatial expansion matrix Q is estimated from the channel estimation information generated for a received transmission (saved channel estimate) sent without spatial expansion and the channel estimate for a received transmission (new channel estimate) sent with spatial expansion, according to the computation: $\hat{Q}_{(n<N_{tx}^{STA})}{}^{(k)} = \hat{H}_{(n=N_{tx}^{STA})}{}^{(k)-1} R_{(n<N_{tx}^{STA})}{}^{(k)} S_{(n<N_{tx}^{STA})}{}^{-1}$. The estimated spatial expansion matrix Q and MAC ID for the STA are saved together at 224 and the AP sends the estimated spatial expansion matrix Q and MAC ID to the WLAN controller 50 (FIG. 3) at 226. The process repeats from 206 when another frame is received by the AP. When at 218 it is determined that Nss is equal to the saved Nss, then the process goes to 212.

When at 220 it is determined that estimated number of spatial streams Nss for the current received transmission or the estimated number of spatial streams for a previously received transmission (saved Nss) is not equal to Ntx, then at 228, it is determined whether Nss is greater than saved Nss. If so, then the process goes to 212. If not, then the process goes to 214 waiting for reception of the next transmission from the STA. Operation 228 is optional in which case a spatial expansion matrix is promptly generated and uploaded to the WLAN controller 50 without waiting for the STA to send a transmission with a different spatial expansion in order to generate a spatial expansion matrix for a different number of spatial streams (less than the number of STA antennas). When operation 228 is used, then all of the spatial expansion matrices used by the STA are generated before they are uploaded to the WLAN controller 50.

Sufficient information is available to compute the spatial expansion matrix for at least one spatial expansion scenario when the number of estimated spatial streams is evaluated over time to determine when at least one transmission has been received with a number of spatial streams equal to the number of antennas of the STA (that is, without spatial expansion) and at least one transmission is received with a number of spatial streams less than the number of antennas at the STA (that is, with spatial expansion). The process 200 may be invoked to evaluate the number of spatial streams received in order to generate each of a plurality of spatial expansion matrices used by a STA when it transmits with a corresponding different number of spatial streams less than the number of antennas at the STA. For example, when it is determined that a STA has 3 antennas, then the STA could use a first spatial expansion matrix, i.e., $Q_1$, for transmitting a single spatial stream via its 3 antennas and a second spatial expansion matrix, i.e., $Q_2$, for transmitting 2 spatial streams via its three antennas. Thus, the AP would want to determine spatial expansion matrix $Q_1$, and spatial expansion matrix $Q_2$ and needs the STA to send transmission with both a single spatial stream and two spatial streams (as well as a transmission with no spatial expansion) to compute both spatial expansion matrices.

As explained above, the AP may transmit a particular message or withhold the transmission of a message (e.g., an ACK message) to the STA so as to cause the STA to send a transmission at a lower transmit data rate and thus with a lesser number of spatial streams in order to obtain sufficient information to generate a spatial expansion matrix used by the STA for that spatial expansion scenario (e.g., when the STA sends a transmission with a corresponding spatial expansion (a lesser number of spatial streams)). An example of a particular message is a Request-to-Send (RTS) message that is part of a RTS-Clear-to-Send (RTS-CTS) exchange where the RTS message sent by the AP is sent with a reduced number of spatial streams so that the STA returns a CTS message with a corresponding number of spatial streams to enable the AP to determine the spatial expansion matrix for that number of spatial streams. The AP may withhold the transmission of an ACK message (even though it successfully received a transmission from the STA) in order to force the STA to retransmit at a lower rate and thus using a different spatial expansion matrix.

The WLAN controller 50 (FIG. 3) stores transmit parameter information including the spatial expansion matrices for each of a plurality of STAs. Once Q is determined for a STA, the Q information is pushed to the WLAN controller 50 (FIG. 3) along with the STA's MAC ID, model number, PHY chipset model or any other identifying characteristic that could be used to match that spatial expansion matrix Q with any other parameter that identifies the STA specifically or as a general class of STAs (e.g. all devices from a particular vendor). Once the information is in the controller 50, any other AP serving that STA has access to the Q information without having to go through a process of estimation. Again, there may be STAs for which there are multiple spatial expansion matrices when a STA has more than two antennas. Thus, a MAC ID for a STA may be associated with a type or model of STAs that are known to all use the same spatial expansion matrices and thus this information can be used by an AP when a STA that matches that model or type associates with it. The information is usable for any STA matching the MAC ID of the STA, or any STA that shares an identifying characteristic that implies it has the same Q matrix.

Figure 6:
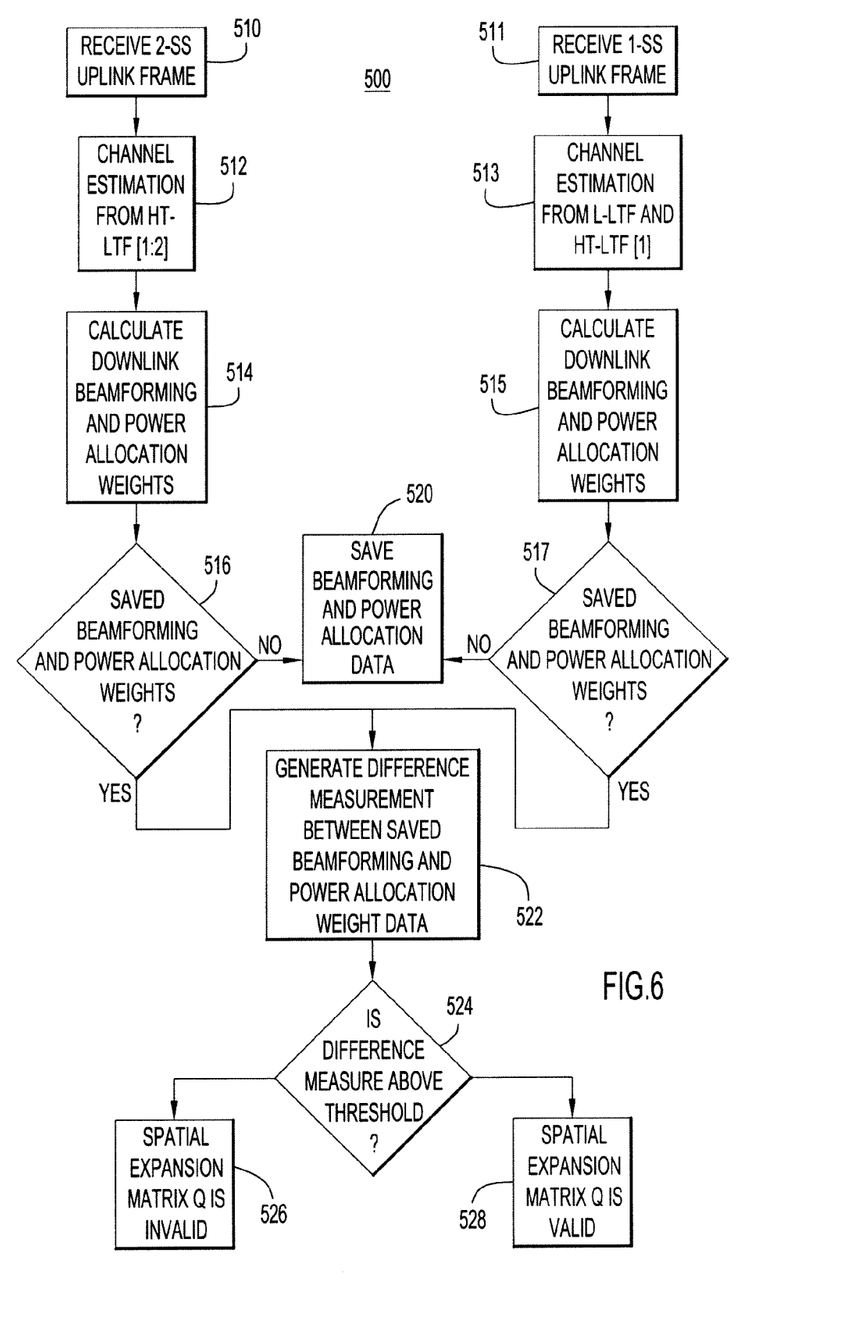
FIG. 6 is a flow chart for a validation process used by the first wireless communication device to determine whether the spatial expansion matrix information is valid.

Turning to FIG. 6, a flow chart is shown for the validation process 500. If the AP is using a spatial expansion matrix Q retrieved from the WLAN controller that does not directly match the MAC ID for a client, a check can be done on the matrix Q. This check can also be done if beamforming performance to the STA is poor, and the suspected reason is an invalid spatial expansion matrix Q estimation. The flow of the validation process 500 is follows.

When a rapid exchange of two-way data traffic is occurring and the STA is successfully uplinking two spatial stream (2-ss) traffic, alternate updating of the beamforming weight and power allocation information is made in two different modes. First, 2 HT-LTFs from the 2-SS uplink are used to estimate the channel. This is shown at 510, 512 and 514. At 510, the 2-ss uplink frame is received. At 512, the AP estimates the channel from the HT-LTF[1:2] frames. At 514, the AP computes the downlink beamforming weights (to that STA) and power allocation weights from the channel estimated at 512 for the 2-ss received frame.

Second, the legacy-long training field (L-LTF) and one HT-LTF from a single spatial (1-ss) stream acknowledgment (ACK) along with the known Q matrix to estimate the channel. This is shown at 511, 513 and 515. That is, at 511, the AP receives a 1-ss uplink frame and at 513 estimates the channel for the L-LTF and HT-LTF[1]. At 515, the AP computes the downlink beamforming weights and power allocation weights from the channel estimate computed at 513 for the 1-ss received frame and from the spatial expansion matrix Q.

If the spatial expansion matrix Q estimate computed according to the process described above in connection with FIG. 5 is valid, then the beamforming weights computed using each method will produce the same (or nearly the same) beamforming and power allocation information. Functions 516 and 517 determine whether the beamforming and power allocation information generated at 514 and 515, respectively, have been saved, and if not, then the information is saved at 520.

Then, at 522, a difference measurement is made between the beamforming weights and/or power allocation weights computed at 514 and the beamforming weights and/or power allocation weights computed at 515 to determine an indication of the validity of the Q estimation. The measurements could be any of several or some combination of the following: (1) Euclidean distance between beamforming weight vectors computed at 514 and 515; (2) the retries (or measure of throughput) difference; and (3) Receive Signal Strength Indicator (RSSI) or SNR difference reported from the STA. When at 524 it is determined that the difference computed at 522 is above a threshold, then at 526, an indication is generated that the estimated spatial expansion matrix Q is invalid and otherwise when the difference is less than the threshold, then at 528, an indication is generated that the spatial expansion matrix Q is valid.

Thus, as depicted in FIG. 6, the spatial expansion matrix computed by an AP or retrieved by an AP from the WLAN controller for a particular STA can be validated. The validation process may be summarized as computing a first channel estimate from a received transmission sent by the particular STA using multiple spatial streams (multiple high-throughput long training frames) and computing first beamforming weight information from the first channel estimate; computing a second channel estimate from a received transmission sent by the particular STA using a single spatial stream (one high-throughput long training frame and one legacy long training frame) and computing second beamforming weight information from the second channel estimate and the spatial expansion matrix for the particular STA; determine a difference between the first beamforming weight information and the second beamforming weight information; generating an indication that the spatial expansion matrix for the particular STA stored at the first wireless communication device or retrieved from the wireless network controller apparatus is valid when the difference is less than a threshold and otherwise generating an indication that the spatial expansion matrix is invalid.

The foregoing test checks the single spatial stream Q matrix. For a 3 transmitter STA, the same test as described above can be run, but an additional test is made to check the two spatial stream spatial expansion matrix by alternating between (1) Beamforming and using power allocation without using the Q estimation to improve the channel estimate, and (2) Beamforming and using power allocation with using the Q estimation to improve the channel estimate. Both modes use channel estimates from the 2-ss data uplink frame. Mode 2 should provide a significant boost to the success rate of the transmitted packets. If the retry rate is worse than mode 1, the two spatial stream Q matrix is invalid.

If the spatial expansion matrix Q is shown to be invalid, the AP re-estimates the matrix Q for that STA. In addition, after the validity check, the AP sends the WLAN controller information that the matrix Q (or subcomponents of the matrix Q) was invalid or valid and where the invalid matrix Q originated (e.g., WLAN controller provided the matrix Q to the AP because of a matching model number, WLAN controller provided the matrix Q to the AP because of a matching MAC ID, WLAN controller provided the matrix Q to the AP because of a matching PHY chipset, the matrix Q was estimated by AP, etc.). The WLAN controller keeps statistics on invalid and valid Q reports and discontinues providing Q matrices based on assumptions (e.g., clients sharing the same model number all have the same matrix Q, etc.) that prove to be false more than a certain percentage of the time based on a significant sample set.

Using a Known Q to Get a Better Channel Estimate

When Q is known, the pseudo-inverse of the matrix Q can be applied to the uplink channel estimate to improve accuracy of the estimate and effectiveness of beamforming and power allocation.

$$\hat{H}^{UP} = H^{UP} Q$$

$$\hat{H}^{Down} = (\hat{H}^{UP})^T = Q^T (H^{UP})^T$$

$$\tilde{H}^{UP} = \hat{H}^{UP} Q^H \text{inv}(QQ^H)$$

$$\tilde{H}^{Down} = (\tilde{H}^{UP})^T$$

Alternatively, the pseudo-inverse can be applied to the downlink channel estimate.

$$\hat{H}^{UP} = H^{UP} Q$$

$$\hat{H}^{Down} = (\hat{H}^{UP})^T = Q^T (H^{UP})^T$$

$$\tilde{H}^{Down} = Q^* \text{inv}(Q^T Q^*) \hat{H}^{Down}$$

Where * denotes the complex conjugate and $^H$ denotes the Hermitian transpose.

Using the Matrix Q to Check Use of L-LTF in Channel Estimation

Using the L-LTF in channel estimation is useful in adding dimensions to the channel estimate. However, certain subcarriers may not see any benefit due to singularities. This will mean that the singular values of the channel for those subcarriers will be zero when the power allocation algorithm is expecting a non-zero value. Furthermore, the beamforming vector will not necessarily benefit the Nss_uplink+1 spatial stream on the downlink for those subcarriers. If the matrix Q is known for the client, the singular condition can be tested before setting power allocation and beamforming for each subcarrier.

$$F(Q) = \det(Q^H Q)$$

where $$Q^k_{nTx,LLTF+Nss} = \begin{bmatrix} Q^1_{LLTF} & Q^{1,1}_{HTLTF} & Q^1_{HTLTF} & \cdots & Q^{1,Uplink\_Nss}_{HTLTF} \\ Q^2_{LLTF} & Q^{2,1}_{HTLTF} & Q^{2,2}_{HTLTF} & \cdots & Q^{1,Uplink\_Nss}_{HTLTF} \\ Q^3_{LLTF} & Q^{3,1}_{HTLTF} & Q^{3,2}_{HTLTF} & \cdots & Q^{1,Uplink\_Nss}_{HTLTF} \\ \vdots & \vdots & \vdots & \ddots & \vdots \\ Q^{nTx}_{LLTF} & Q^{nTx,1}_{HTLTF} & Q^{nTx,2}_{HTLTF} & \cdots & Q^{nTx,Uplink\_Nss}_{HTLTF} \end{bmatrix}_k$$

If $F(Q) \leq X_{singular}$, the number of non-zero singular values of the channel estimation will only be Nss of the uplink, not Nss+1 for that particular subcarrier, where $X_{singular}$ is some threshold that is close to 0.

If $F(Q) \leq X_{singular}$ for a subcarrier, the system can either avoid using power allocation and beamforming for that subcarrier or can interpolate singular values for the Nss+1 singular value from those from the adjacent subcarriers.

Interpolation of the singular value is then computed as:

$$s_k^{Nss+1} = .5 \sum_{j=-1}^{1} s_{k+j}^{Nss+1}$$

where Nss is the number of spatial streams of the uplink frame.

The above is intended by way of example only.

What is claimed is:

1. A method comprising:
   receiving transmissions at a plurality of antennas of a first wireless communication device sent from a plurality of antennas of a second wireless communication device;
   generating for received transmissions channel estimate information for a wireless channel between the plurality of antennas of the first wireless communication device and the plurality of antennas of the second wireless communication device;
   estimating a number of spatial streams for received transmissions based on transmit rate information contained in the received transmissions;
   evaluating the estimated number of spatial streams for received transmissions with respect to a number of antennas at the second wireless communication device to determine when sufficient information is available to estimate a spatial expansion matrix used by the second wireless communication device when sending to the first wireless communication device transmissions comprising a number of spatial streams less than the number of antennas of the second wireless communication device; and
   when it is determined that sufficient information is available, generating an estimate of the spatial expansion matrix from the channel estimate information for a received transmission determined to have been sent with a number of spatial streams less than the number of antennas of the second wireless communication device and from the channel estimate information for a received transmission determined to have been sent without spatial expansion.

2. The method of claim 1, wherein evaluating and generating the estimate of the spatial expansion matrix are performed with respect to received transmissions to determine each of a plurality of spatial expansion matrices used by the second wireless communication device when transmitting to the first wireless communication device with a corresponding different number of spatial streams less than the number of antennas of the second wireless communication device.

3. The method of claim 1, and further comprising determining the number of antennas of the second wireless communication device from information contained within a connectivity association message received from the second wireless communication device or from stored information indicating the number of antennas for the second wireless communication device and an identifier of the second wireless communication device.

4. The method of claim 1, and further comprising determining whether a time interval between reception of a current received transmission and reception of a previously received transmission is within a channel coherence time, wherein evaluating is performed when the time interval is less than the channel coherence time.

5. The method of claim 4, and further comprising, when the time interval is not less than the channel coherence time, storing the channel estimate information for the current received transmission, time of reception of the current received transmission, and estimated number of spatial streams for the current received transmission.

6. The method of claim 5, wherein evaluating comprises evaluating the estimated number of spatial streams for received transmissions over time to determine when at least one transmission has been received with a number of spatial streams equal to the number of antennas at the second wireless communication device and at least one transmission received with a number of spatial streams less than the number of antennas of the second wireless communication device.

7. The method of claim 1, and further comprising storing the estimate of the spatial expansion matrix together with an identifier of the second wireless communication device.

8. The method of claim 7, and further comprising sending the estimate of the spatial expansion matrix together with the identifier of the second wireless communication device to a central controller apparatus which stores transmit parameter information including the spatial expansion matrices used by each of a plurality of second wireless communication devices.

9. The method of claim 8, and further comprising, upon receiving a connectivity initiation message at the first wireless communication device from a particular second wireless communication device, comparing an identifier of the particular second wireless communication device with stored information to determine whether the first wireless communication device already has stored transmit parameter information including one or more spatial expansion matrices for the particular second wireless communication device or for a model or type of the particular second wireless communication device.

10. The method of claim 9, and further comprising communicating with the central controller apparatus to retrieve from the central controller apparatus transmit parameter information including one or more spatial expansion matrices for the particular second wireless communication device or for a model or type of the particular second wireless communication device when it is determined that the first wireless communication device does not have stored transmit parameter information for the particular second wireless communication device, and wherein receiving, generating channel estimate information, estimating the number of spatial streams, evaluating the estimated number of spatial streams and generating the estimate of the spatial expansion matrix are performed when it is determined that the central controller apparatus does not have stored transmit parameter information for the particular second wireless communication device.

11. The method of claim 9, when it is determined that the first wireless communication device already has stored transmit parameter information including the spatial expansion matrix for the particular second wireless communication device or retrieves the transmit parameter information for the particular second wireless communication device from the central controller apparatus, further comprising validating the spatial expansion matrix.

12. The method of claim 11, wherein validating comprises computing a first channel estimate from a received transmission sent by the particular second wireless communication device using multiple spatial streams and computing first beamforming weight information from the first channel estimate; computing a second channel estimate from a received transmission sent by the particular second wireless communication device using a single spatial stream and computing second beamforming weight information from the second channel estimate and a spatial expansion matrix estimated for the particular second wireless communication device for a single spatial stream; determining a difference between the first beamforming weight information and the second beamforming weight information; and generating an indication that the spatial expansion matrix for the particular wireless communication device stored at the first wireless communication device or retrieved from the wireless network controller apparatus is valid when the difference is less than a threshold and otherwise generating an indication that the spatial expansion matrix is invalid.

13. The method of claim 12, wherein computing the first beamforming weight information is based on reception of multiple high-throughput training frames and computing the second beamforming weight information is based on reception of one high-throughput training frame and one legacy training frame.

14. The method of claim 13, and further comprising at the first wireless communication device transmitting a particular message or withholding the transmission of a message to the second wireless communication device so as to cause the second wireless communication device to send a transmission at a lower transmit data rate and with a lesser number of spatial streams in order to obtain sufficient information to generate a spatial expansion matrix used by the second wireless communication device when sending a transmission with a lesser number of spatial streams.

15. An apparatus comprising:
a plurality of antennas;
a radio receiver configured to be coupled to the plurality of antennas and to generate a signals derived from transmissions sent by an other wireless communication device and detected at the plurality of antennas;
a controller coupled to the radio receiver and configured to:
generate for received transmissions channel estimate information for a wireless channel with respect to antennas of the other wireless communication device;
estimate a number of spatial streams for received transmissions based on transmit rate information contained in the received transmissions;
evaluate the estimated number of spatial streams for received transmissions with respect to a number of antennas at the other wireless communication device to determine when sufficient information is available to estimate a spatial expansion matrix used by the other wireless communication device when sending transmissions comprising a number of spatial streams less than the number of antennas of the other wireless communication device; and
when it is determined that sufficient information is available, generate an estimate of the spatial expansion matrix from the channel estimate information for a received transmission determined to have been sent with a number of spatial streams less than the number of antennas of the other wireless communication device and from the channel estimate information for a received transmission determined to have been sent without spatial expansion.

16. The apparatus of claim 15, wherein the controller is configured to evaluate and generate the estimate of the spatial expansion matrix with respect to received transmissions to determine each of a plurality of spatial expansion matrices used by the other wireless communication device when sending transmissions with a corresponding different number of spatial streams less than the number of antennas of the other wireless communication device.

17. The apparatus of claim 15, wherein the controller is configured to evaluate the estimated number of spatial streams for received transmissions over time to determine when at least one transmission has been received with a number of spatial streams equal to the number of antennas at the other wireless communication device and at least one transmission received with a number of spatial streams less than the number of antennas of the other wireless communication device.

18. The apparatus of claim 15, wherein the controller is further configured to upon receiving a connectivity initiation message from a particular wireless communication device, compare an identifier of the particular wireless communication device with stored information to determine whether the stored information includes transmit parameter information including one or more spatial expansion matrices for the particular wireless communication device or for a model or type of the particular wireless communication device.

19. A non-transitory computer readable medium storing instructions that, when executed by a processor, cause the processor to:
generate, for transmissions received at a plurality of antennas from an other wireless communication device, channel estimate information for a wireless channel with respect to antennas of the other wireless communication device;
estimate a number of spatial streams for received transmissions based on transmit rate information contained in the received transmissions;
evaluate the estimated number of spatial streams for received transmissions with respect to a number of antennas at the other wireless communication device to determine when sufficient information is available to estimate a spatial expansion matrix used by the other wireless communication device when sending transmissions comprising a number of spatial streams less than the number of antennas of the other wireless communication device; and when it is determined that sufficient information is available, generate an estimate of the spatial expansion matrix from the channel estimate information for a received transmission determined to have been sent with a number of spatial streams less than the number of antennas of the other wireless communication device and from the channel estimate information for a received transmission determined to have been sent without spatial expansion.

20. The non-transitory readable medium of claim 19, wherein the instructions that cause the processor to evaluate and generate the estimate of the spatial expansion matrix comprise instructions that, when executed by the processor, cause the processor to evaluate and generate the estimate of the spatial expansion matrix with respect to received transmissions to determine each of a plurality of spatial expansion matrices used by the other wireless communication device when sending transmissions with a corresponding different number of spatial streams less than the number of antennas of the other wireless communication device.

21. The non-transitory computer readable medium of claim 20, wherein the instructions that cause the processor to evaluate comprise instructions that cause the processor to evaluate the estimated number of spatial streams for received transmissions over time to determine when at least one transmission has been received with a number of spatial streams equal to number of antennas at the other wireless communication device and at least one transmission received with a number of spatial streams less than the number of antennas of the other wireless communication device.

22. The apparatus of claim 15, wherein the controller is further configured to determine whether a time interval between reception of a current received transmission and reception of a previously received transmission is within a channel coherence time, to perform the evaluate operation when the time interval is less than the channel coherence time.

23. The apparatus of claim 22, wherein the controller is further configured to, when it is determined that the time interval is not less than the channel coherence time, store channel estimate information for the current received transmission, time of reception of the current received transmission, and estimated number of spatial streams for the current received transmission.

24. The apparatus of claim 15, wherein the controller is configured to store the estimate of the spatial expansion matrix together with an identifier of the other wireless communication device.

25. The non-transitory computer readable storage media of claim 19, further comprising instructions operable to determine the number of antennas of the other wireless communication device from information contained within a connectivity association message received from the other wireless communication device or from stored information indicating the number of antennas for the other wireless communication device and an identifier of the other other communication device.

26. The non-transitory computer readable storage media of claim 19, further comprising instructions operable to determine whether a time interval between reception of a current received transmission and reception of a previously received transmission is within a channel coherence time, wherein evaluating is performed when the time interval is less than the channel coherence time.

27. The non-transitory computer readable storage media of claim 26, further comprising instructions operable to, when the time interval is not less than the channel coherence time, store the channel estimate information for the current received transmission, time of reception of the current received transmission, and estimated number of spatial streams for the current received transmission.

* * * * *